(No Model.) 4 Sheets—Sheet 1.
W. H. NEWTON & W. H. BAILEY.
DRILL AND CULTIVATOR.
No. 392,283. Patented Nov. 6, 1888.
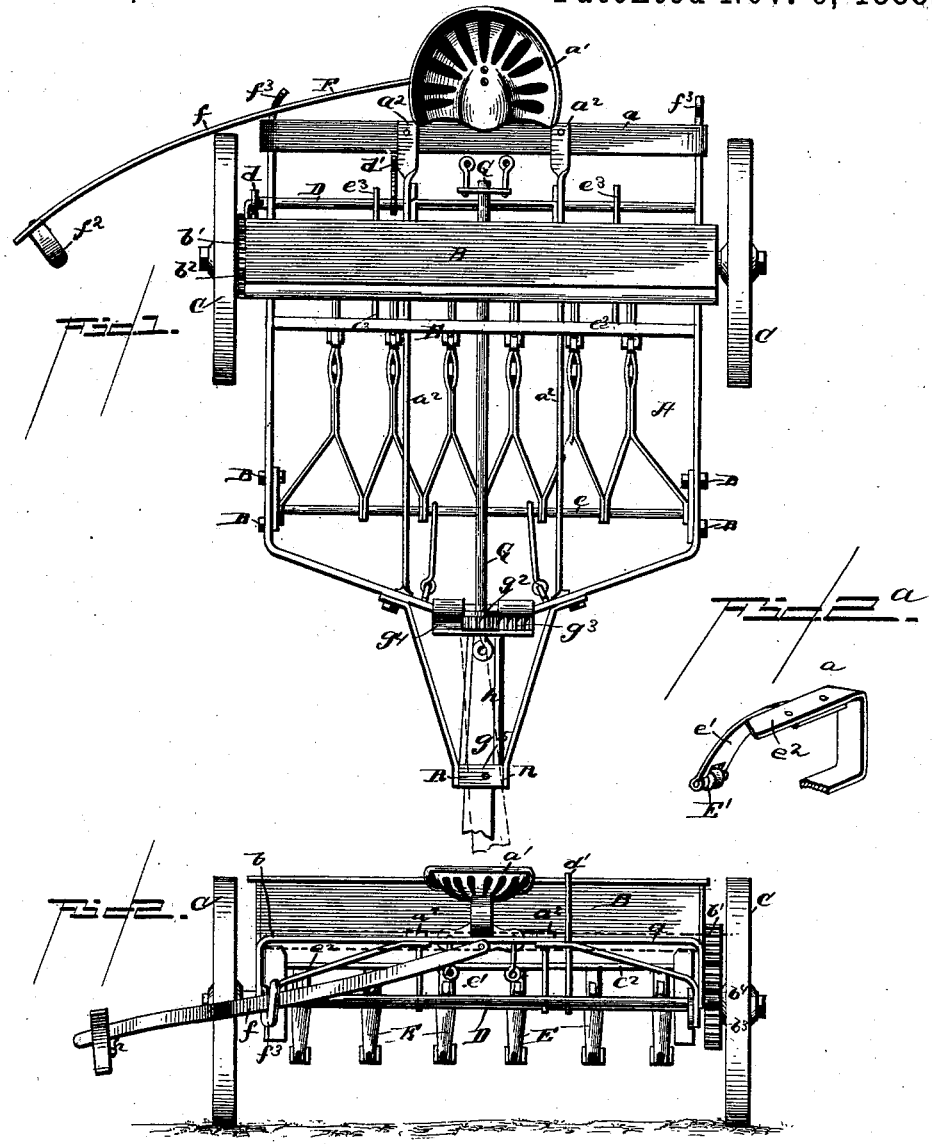
WITNESSES
INVENTOR
William H. Newton
William H. Bailey
By Alpra... Attorneys

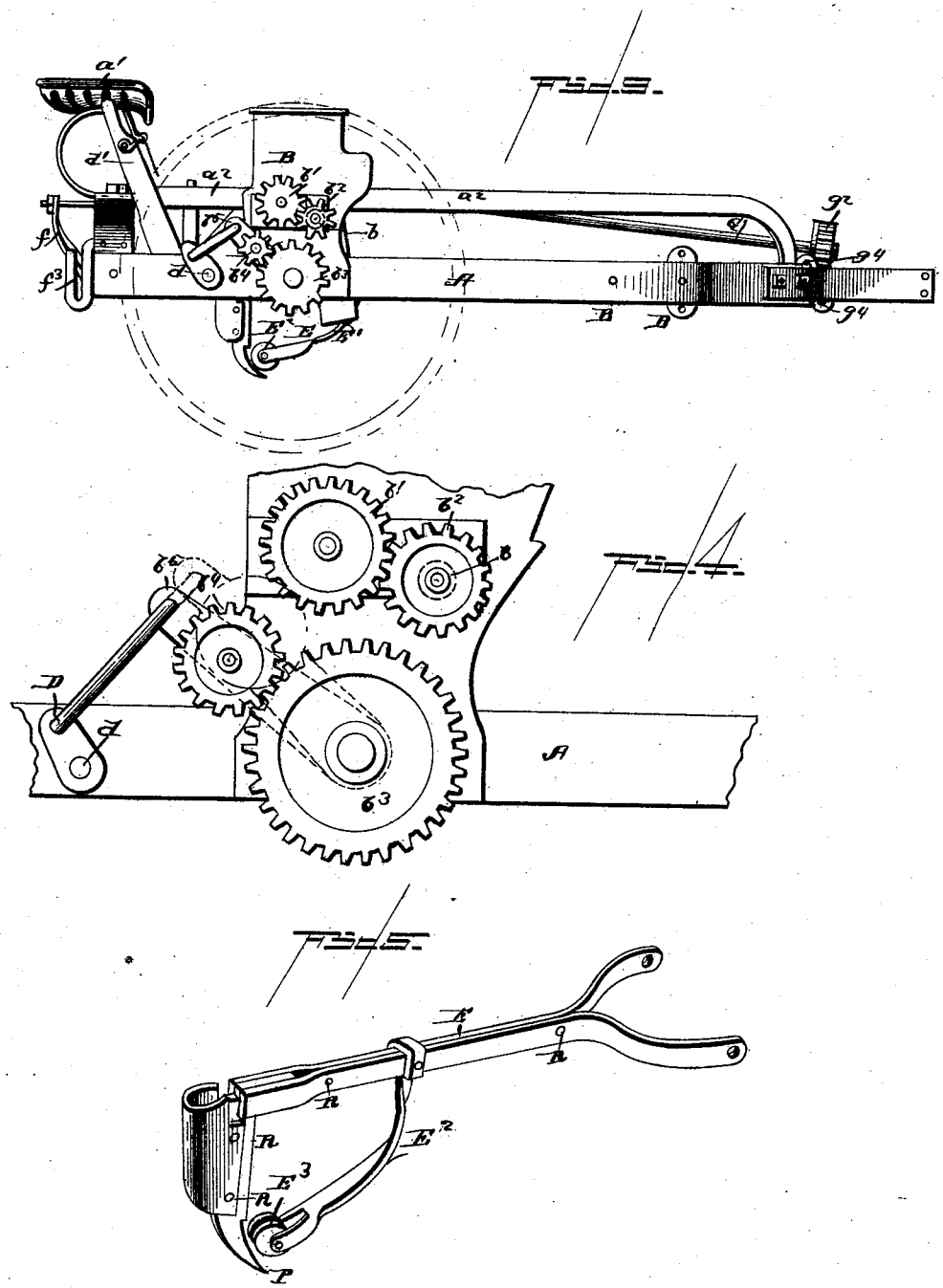

(No Model.) 4 Sheets—Sheet 3.
W. H. NEWTON & W. H. BAILEY.
DRILL AND CULTIVATOR.
No. 392,283. Patented Nov. 6, 1888.
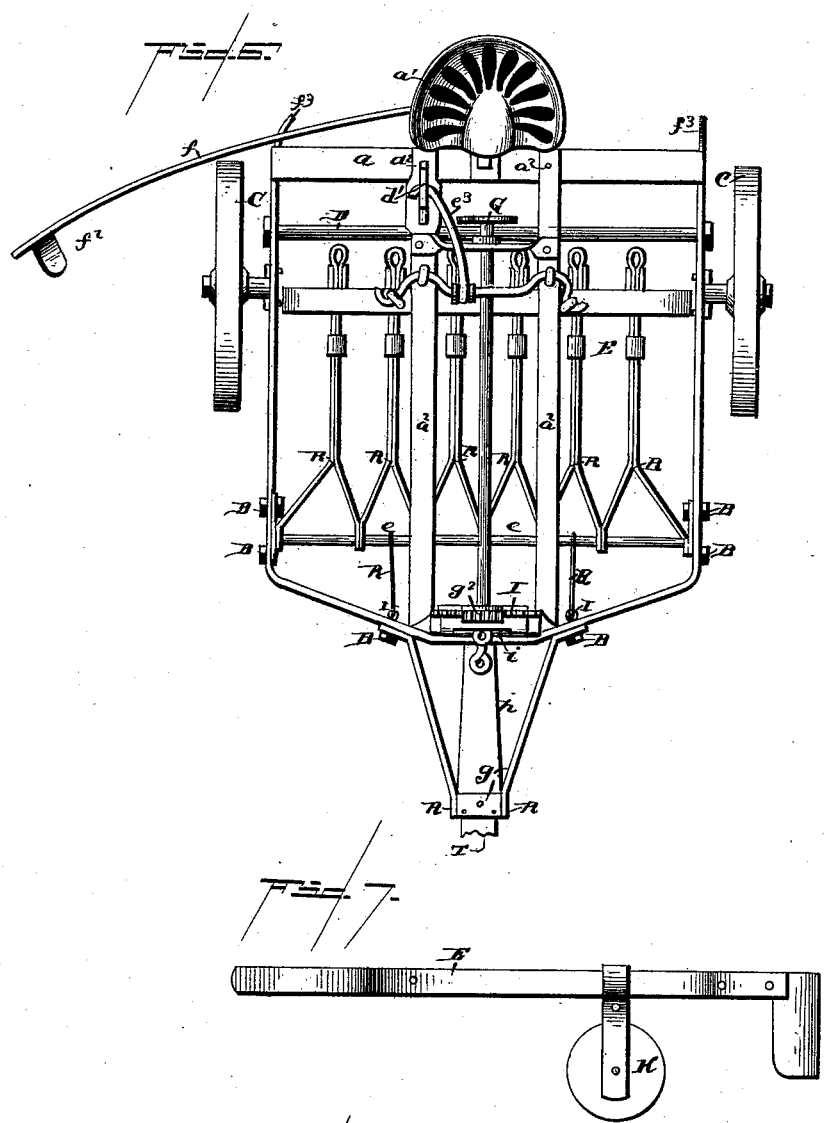
WITNESSES. INVENTOR.

(No Model.) 4 Sheets—Sheet 4.
W. H. NEWTON & W. H. BAILEY.
DRILL AND CULTIVATOR.
No. 392,283. Patented Nov. 6, 1888.
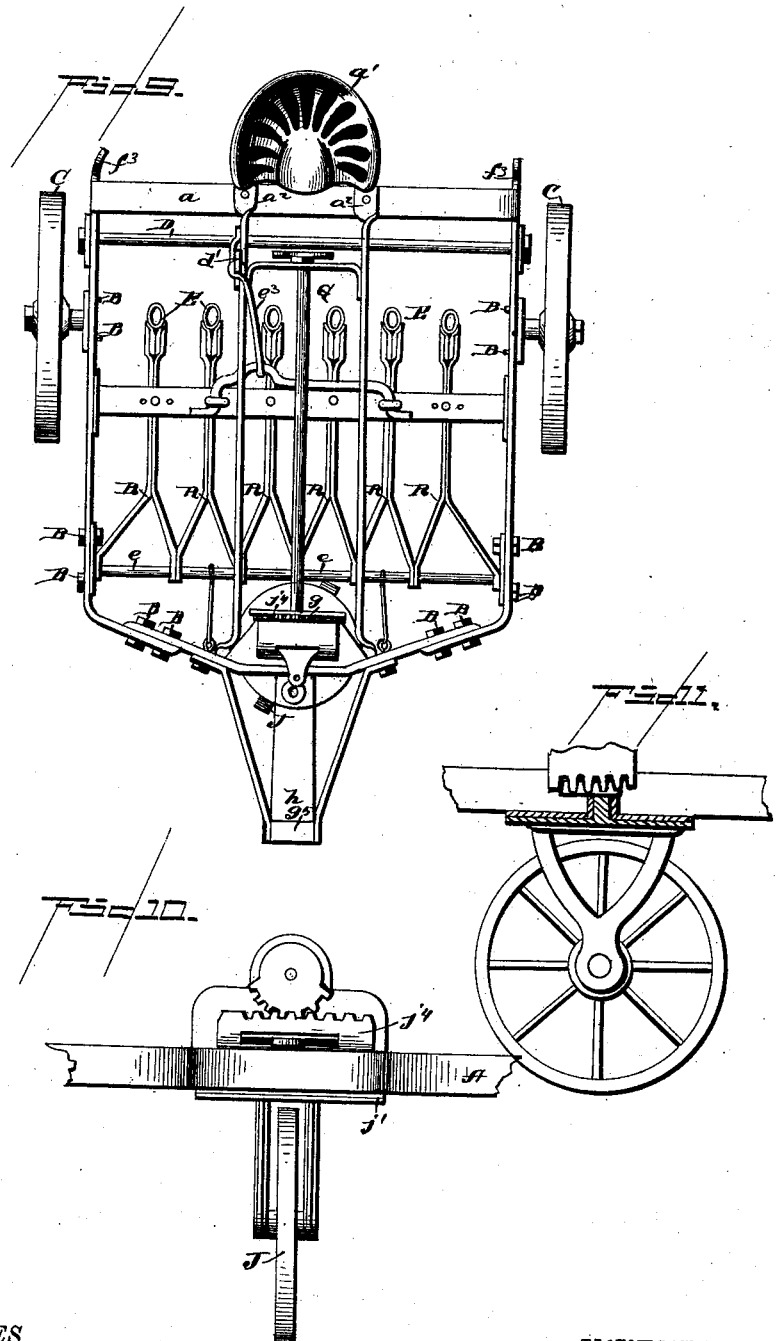
WITNESSES.
INVENTOR.

UNITED STATES PATENT OFFICE.

WILLIAM H. NEWTON AND WILLIAM H. BAILEY, OF TOWER HILL, ILLINOIS; SAID BAILEY ASSIGNOR TO SAID NEWTON.

DRILL AND CULTIVATOR.

SPECIFICATION forming part of Letters Patent No. 392,283, dated November 6, 1888.

Application filed June 2, 1888. Serial No. 275,898. (No model.)

*To all whom it may concern:*

Be it known that we, WILLIAM H. NEWTON and WILLIAM H. BAILEY, citizens of the United States of America, residing at Tower Hill, in the county of Shelby and State of Illinois, have invented certain new and useful Improvements in Combined Drill and Cultivator, of which the following is a specification, reference being had therein to the accompanying drawings.

This invention pertains to certain new and useful improvements in seed-drills; and it consists in the details of construction, combination, and arrangement of parts, substantially as hereinafter fully set forth, and particularly pointed out in the claims.

In the accompanying drawings, Figure 1 is a plan view of our improved cultivator. Fig. 2 is a rear end view. Fig. $2^a$ is a detail perspective view. Fig. 3 is a side elevation with one of the carrying-wheels removed. Fig. 4 is a transverse sectional view. Fig. 5 is a detail view of one of the drills. Fig. 6 is a plan view of a modification. Figs. 7 and 8 are detail views thereof. Fig. 9 is a plan view of another modification, and Figs. 10 and 11 are detail views thereof.

Referring to the drawings, A designates the drill-frame, the rear ends of the side bars of which are connected by a cross-bar, $a$, whereon the driver's seat $a'$ is located, and to this cross-bar are connected the rear ends of two supporting-bars, $a^2$ $a^2$, secured at their forward ends to the front of the frame.

B is the seed-box, suitably mounted upon the frame A, and in said box works an ordinary agitating-roll, $b$, upon one end of which is secured a pinion or small gear-wheel, $b'$, intermeshing with a second similar pinion or gear-wheel, $b^2$.

C C are two carrying-wheels loosely secured to their axles, and to the hub of one of said wheels is secured a large pinion or gear-wheel, $b^3$, with which intermeshes a pinion, $b^4$, journaled upon an arm, $b^5$, attached to the axle. This pinion $b^4$ is designed to be thrown in and out of gear with the pinion or gear-wheel $b^2$.

D is a rock-shaft secured to the frame A, and is provided with a right-angular plate or arm, $d$, which is loosely connected to the outer end of the arm $b^5$. To this rock-shaft is connected a lever, $d'$, by means whereof said shaft can be operated.

E designates the series of drill-tooth bars, carrying the teeth at their rear ends and pivotally secured at their forward ends to a cross-bar, $e$. Upon the upper edge of each drill-tooth bar bears a small grooved roller, E', secured in the lower recessed end of a curved spring-arm, $a'$, attached at its other end to a cross-bar, $e^2$, of frame A. The spring-arms $e'$ are designed to hold the drill-teeth down to their work, and are used in lieu of and are an improvement over the ordinary coil-springs.

A slightly curved or bent arm, $E^2$, is secured to each drill-tooth bar so as to project beneath the same, and the lower inner end of said arm is forked and has loosely secured thereto two small rollers or wheels, $E^3$, which occupy a position immediately in front of the drill proper.

To the under side of the cross-bar $e^2$ of the drills is loosely connected the forward end of an arm, $e^3$, rigidly secured to the rock-shaft D, whereby by moving said rock-shaft said drills can be raised or lowered, as desired, and at the same time the wheel or pinion $b^4$ will be thrown in or out of gear, starting or ceasing the agitation of the seed or grain in the seed-box.

F is a marker, composed of a curved bar, $f$, to the outer end of which is connected a bar, $f'$, for effecting the marking, and said marker is pivotally secured on a short rear central extension or stud, $f^2$, projecting from the frame A. This marker is designed to rest in and be supported by either one of two curved or U-shaped bars, $f^3$ $f^3$, attached to the frame A.

G is a centrally-disposed longitudinal rod resting at its rear end in a cross-bar, $g$, and to this rod is connected a treadle-bar, $g'$, whereon rest the feet of the driver or operator. To the forward end of this rod G is connected a pinion, $g^2$, gearing or intermeshing with a rack-bar, $g^3$, working in a grooved plate, $g^4$, in front of which is formed a slot or recess, $g^5$.

The tongue H is projected through a loop, $h$, and its rear end is extended through the slot or recess $g^5$ and connected to the rack-bar $g^3$, whereby by pressing on the treadle-bar $g'$ the tongue will be shifted from side to side, so as to throw the same in the line of draft.

In lieu of the above-described form of mechanism for shifting the tongue, that shown in Fig. 6 may be employed. In this form the rack-bar has a horizontal right-angular portion, I, provided with a central tongue projecting through an aperture of a guide-plate, $i$.

In Fig. 9 we have shown a still further modification of our invention; and it consists in the employment of a caster-wheel, J, the flat horizontal plate or fifth-wheel $j$ of which has a central hub, $j'$, whereon is secured a beveled pinion, $j^2$, with which intermesh the teeth of a lower rack-bar, $j^3$, attached to the upper rack-bar, $j^4$, which may, as in this instance, be operated through the agency of a sector-plate, $j^5$, on the end of the rod G.

A modified form of the drill-bar E is shown in Fig. 7, wherein a single cutter wheel or disk, K, is employed, located a short distance in front of the drill-point.

If desired, instead of connecting the arm $e^3$ of the lever $d'$ directly to the drills, the same can be connected to a rock-shaft, $k$, which, as shown in Fig. 6, is mounted on the bars $a^2$; or said rock-shaft can be secured to the under side of said bars, as shown in Fig. 9.

We claim as our invention—

1. As an improvement in grain-drills, the combination, with the drill-frame, of the inclined rod secured thereto, and having a treadle-bar and treadle at one end, a wheel or pinion attached to the forward end of said rod, the horizontal rack-bar with which said pinion engages, and the pivoted tongue connected to said rack-bar, substantially as shown and described.

2. The combination, with the drill-frame, of the inclined rod secured thereto, and having a treadle-bar and treadle at its upper rear end and a pinion at its lower forward end, the horizontal bar with which said pinion engages, the slotted guide-plate secured to the front of said frame, and the pivoted tongue, substantially as shown and described.

3. As an improvement in grain-drills, the series of spring-arms $e'$, carrying frictional rollers in their ends, bearing on the upper edges of the drill-bars, substantially as shown and described.

In testimony whereof we affix our signatures in presence of two witnesses.

WILLIAM H. NEWTON.
WILLIAM H. BAILEY.

Witnesses:
R. HIGGINBOTHAM,
D. EILER.